June 12, 1951 C. M. LEE 2,556,546

DIAPHRAGM ASSEMBLY

Filed March 10, 1948

CHARLES M. LEE
*INVENTOR*

BY
*ATTORNEYS*

Patented June 12, 1951

2,556,546

UNITED STATES PATENT OFFICE 2,556,546

DIAPHRAGM ASSEMBLY

Charles M. Lee, Rochester, N. Y., assignor to Eastman Kodak Company, Rochester, N. Y., a corporation of New Jersey Application March 10, 1948, Serial No. 14,089

9 Claims. (Cl. 95—64)

The present invention relates to photography, and more particularly to a combined lens mount and diaphragm assembly especially designed for a photographic enlarger.

One object of the invention is the provision of a novel assembly which is simple in structure, comprising few parts of rugged construction which may be readily and easily assembled.

Another object of the invention is the provision of a simple mechanism by which the diaphragm parts may be held in assembled relation yet permitting relative movement thereof to adjust the diaphragm to vary the opening thereof.

Still another object of the invention is the provision of an arrangement by which the diaphragm adjustments may be determined by feel and/or sound so as to enable the adjustments to be made easily and accurately in the dark as well as in the light.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

The present invention relates to a new and improved form of diaphragm and lens mount assembly especially designed for use on enlargers. It is contemplated, however, that the structure of the present invention is adapted for use in a wide variety of applications which employ an adjustable iris diaphragm. The assembly comprises, in general, a fixed supporting member on which is rotatively mounted a diaphragm operating member or ring. These parts are formed of any suitable material and are adapted to receive lens elements so as to form a combined lens mount and diaphragm assembly. An iris diaphragm is positioned between the parts and is connected thereto in such a manner that when the diaphragm operating member or ring is rotated relative to the support, the diaphragm blades will be adjusted to vary the diaphragm opening. Cooperating means on the support and member serve to limit the relative rotation of the parts and thus afford limiting adjusting means for the diaphragm. An annular bowed spring carried by the member serves to yieldably retain the parts in assembled relation, and is provided with detents or depressions which cooperate with a fixed ball on the support to provide "click" stops which provide intermediate adjusting means for the diaphragm. By means of such an arrangement, the adjustment of the diaphragm can be indicated by feel and/or sound so that the various adjustments thereof can be made in the dark as in the light.

Figure 4:
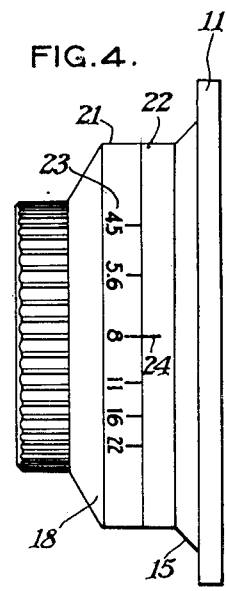
Fig. 4 is an exterior view of the lens mount and diaphragm assembly of the present invention.

In the preferred embodiment of the invention, a support of molded plastic or other suitable material is formed to provide a square or other shaped portion 11 which may be connected to an enlarger or other suitable apparatus in any suitable well known manner. The support has formed integral therewith a rearwardly projecting tubular boss or sleeve 12 adapted to receive a rear lens element 13 which is held in place by a threaded retainer ring 14. A tubular member 15 projects forwardly from the support and terminates in an annular flange 16 which is adapted to be received in an annular peripheral groove 17 formed on the rear end of a diaphragm operating member 18 of a shape best shown in Fig. 1. The base 19 of the groove 17 is adapted to cooperate with the inner surface 20 of the flange 16 to position the member 18 radially on the support, as is apparent from an inspection of Fig. 1. The outer periphery 21 of the member 18 is of the same diameter and is in alignment with the outer surface 22 of the flange 16 and carries a diaphragm scale 23 which cooperates with a fixed mark or pointer 24 on the surface 22, as best shown in Fig. 4. The member 18 has mounted therein a front lens element 25 carried by a lens cell 26 which is held in place by a threaded retaining ring 27, all as shown in Fig. 1.

Figure 2:
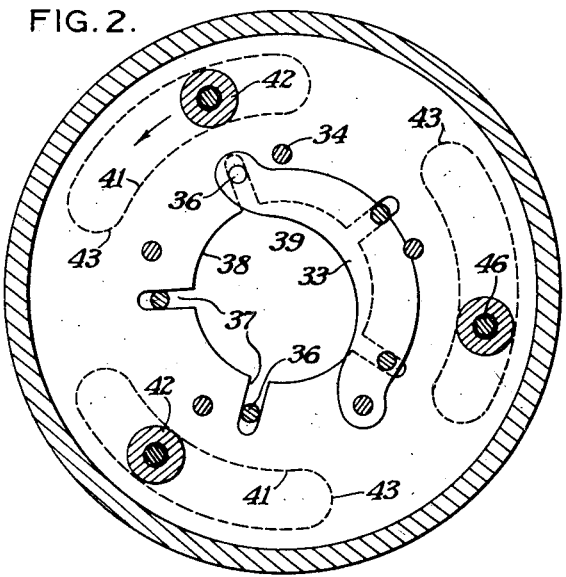
Fig. 2 is a transverse sectional view through the assembly illustrated in Fig. 1 and taken substantially on line 2—2 thereof, showing the arrangement for connecting the parts together, and for providing limiting adjustments of the diaphragm.
Figure 3:
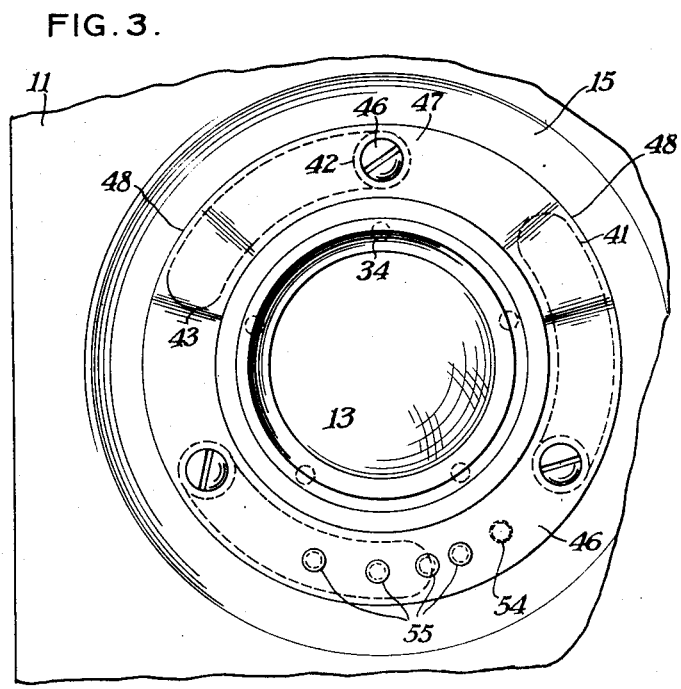
Fig. 3 is a back view of the assembly, showing the bowed spring arrangement for securing the parts together yieldably, and for providing intermediate points or "click" stop adjustment for the diaphragm.

The rear face 31 of the member 18 is formed with a circular recess 32 adapted to receive a plurality of overlying iris diaphragm blades 33 of well known construction. As these blades do not form a part of the present invention, further description thereof is not deemed necessary. Each blade is pivoted at 34 on the front face 35 of the fixed support, while the free end carries a pin 36 positioned in a slot 37 which extends inwardly from the inner edge 38 of a central opening 39 of the member 18, as best shown in Fig. 2. It will now be apparent that if a relative rotating movement is imparted to the support and member 18, the blades 33 will be moved to vary the adjustment of the diaphragm opening. As the rear member or support is fixed, the diaphragm adjustments can be made by merely rotating the member 18 on the support, as is deemed apparent.

Figure 1:
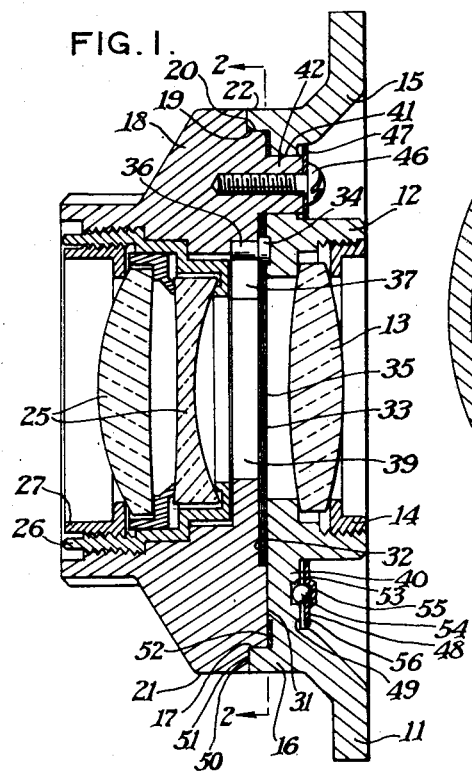
Fig. 1 is a longitudinal sectional view through a diaphragm and lens mount assembly of the present invention, showing the relation of the various parts.

In order to enable the parts to be rotated relatively to adjust the diaphragm blades, the support is formed with a radial rib 40 which connects the tube 12 and the tubular member 15, see Fig. 1, and is provided with a plurality, in the present instance three, arcuate shaped slots 41 adapted to receive cylindrical lugs 42 projecting rearwardly from the member 18. When the member 18 is rotated on the support, the diaphragm blades will be adjusted to vary the diaphragm opening, as is apparent. Such movement would cause the lugs 42 to move along the slots 41, see Fig. 2. Continued rotation of the member 18 will finally bring the lugs into arresting relation with one of the ends 43 of the slots 41 to prevent further movement of the member. The particular end of the slot engaged by the lug depends, of course, on the direction of the rotation of the member 18 relative to the support. Thus, the lugs 42 cooperate with the ends 43 of the slots 41 to provide limiting adjustments for the member 18, and hence the diaphragm blades 33. Such an arrangement provides a maximum and minimum adjustment for the diaphragm.

In order to retain the support and member 18 in proper assembled relation, the rear ends of the lugs 42 have secured thereto, by means of screws 46, an annular flexible ring or spring 47 having portions 48, between the lugs 42, which are bent out of the plane of the spring so as to engage the rear surface 49 of the rib 40. This bowed spring thus urges the member 18 yieldably to the right, as viewed in Fig. 2, to bring a radial shoulder 50 of the member 18 into abutting relation with the face 51 of the flange 16 to connect the parts yieldable in assembled relation and to position the member 18 axially on and relative to the support, as will be apparent from an inspection of Fig. 1. Thus, the member 18 is rotatively mounted on and yieldably connected to and axially and radially positioned on the support to form therewith a unitary lens mount and diaphragm assembly. Preferably a flat annular washer 52 is positioned between the member 18 and the support to reduce wear between the parts.

As mentioned above, when the member 18 is rotated sufficiently, the lugs 42 will finally engage ends 43 of the slots 41. These ends thus afford limiting means by which the movement or adjustment of the diaphragm operating member or ring 18 may be controlled so as to provide two points of adjustments for the diaphragm blades. These points are the limiting points of adjustment, maximum and minimum, and are shown by the number as "4.5" and "22" on the scale 23, Fig. 4. These limiting points of adjustment can be determined by the sense of feel and can, therefore, be readily made in the dark without the necessity of looking at the scale. It is often desirable, however, to provide additional or intermediate points of adjustment for the diaphragm. As such adjustments are often made in the dark, it is desirable to provide an arrangement by which the operator can hear and/or feel when these adjustments are made correctly, thus eliminating any error in the positioning of the diaphragm blades. To this end, a plurality, in the present instance four, intermediate "click" stops are provided.

To provide such "click" stops, the rear face 49 of the rib 40 is formed with a small recess 53 in which a small metal ball 54 is positioned. The annular spring 47 has formed therein four properly spaced depressions or recesses 55. It will now be apparent that when the member 18 is moved or rotated relative to the fixed support, the ball 54 will ride along the front face 56 of the bowed spring member 47. However, when the member 18 has been adjusted to a position to bring one of the designations "5.6" "8" "11" or "16" of scale 23 into registry with the fixed pointer 24, the spring 47 will have been moved sufficiently to bring the corresponding recess 55 into registry with the ball 54. The latter will then snap into the registering recess to position the member 18 to provide a desired intermediate "click" stop or adjustment for the diaphragm. The engagement of the ball in one of the recesses can be determined by feel and is also accompanied by a faint audible click, thus clearly indicating to the operator that one of the intermediate points of adjustment has been reached. The particular point of adjustment depends, of course, on the initial position of the member 18 and the direction or rotation thereof. Thus, two limiting positions and four intermediate "click" positions of adjustment are provided, and all of these adjustments can be made without referring to the scale 23 so that they may be made in the dark as in the light. If desired, additional "click" stops may be provided, but, obviously, the greater the number of such stops, the greater is the chance of error.

Thus the present invention provides a combined lens mount and diaphragm assembly which comprises few parts of rugged construction. The parts are held yieldably in assembled relation, yet may readily and easily be adjusted to secure the desired diaphragm opening. Two limiting points of adjustment and four intermediate "click" stops are provided to afford a range of diaphragm positions which may be readily made in the dark.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. A diaphragm assembly comprising, in combination, a tubular support, a tubular diaphragm-operating member rotatably mounted on said support and arranged coaxially therewith, axially flexible means attached to the diaphragm operating member so as to rotate therewith to connect said member resiliently to said support, a diaphragm carried by said member and operatively connected to and coaxial with said support so that rotation of said member on said support will adjust said diaphragm, stop-indicating means formed on said flexible means and means on said support cooperating selectively with said indicating means to indicate adjustments of said diaphragm.

2. A diaphragm assembly comprising, in combination, a tubular support, a tubular diaphragm-operating member rotatably mounted on said support and arranged coaxially therewith, means including an annular axially flexible bowed spring attached to and rotatable with said member and concentric therewith and engaging said support to retain said member and support resiliently in connected and axial relation, a diaphragm carried by said member and operatively connected to and coaxial with said support so that rotation of said member on said support will adjust said diaphragm, said spring being formed with a plurality of annularly spaced recesses and means on said support engaging said recesses selectively to indicate adjustments of said diaphragm.

3. A diaphragm assembly comprising, in combination, a tubular support, a tubular diaphragm-operating member rotatably mounted on said support and arranged coaxially therewith, axially flexible spring means attached to the diaphragm operating member so as to rotate therewith to connect said member resiliently to said support, a pair of inwardly projecting axially spaced shoulders formed on said support and member, a diaphragm positioned between said shoulders and operatively connected to said support and member so that rotation of the latter will serve to adjust said diaphragm, adjustment-indicating means formed on said spring means, means on said support engaging said indicating means to indicate adjustments of said diaphragm, and means independent of the connecting means to radially position said member on and in coaxial relation with said support.

4. A diaphragm assembly comprising, in combination, a tubular support, a tubular diaphragm-operating member rotatably mounted on said support, means to position said member axially on and in coaxial relation with said support, axially resilient spring means attached to the diaphragm operating member so as to rotate therewith and connecting said support and member and maintaining resiliently the axial relation thereof, a diaphragm coaxially positioned on said member and operatively connected to the latter and said support so that rotation of said member relative to said support will adjust said diaphragm and means on said support cooperating with and engaging complementary means on the spring means to indicate adjustments of said diaphragm.

5. A diaphragm assembly comprising, in combination, a tubular support, a tubular diaphragm-operating member rotatably mounted on said support, means to position said member axially on and in coaxial relation with said support, an annular axially flexible and bowed spring member attached to and rotatable with said member and concentric with said support and engaging the latter to connect said member resiliently to said support and to maintain the axial relation therewith, a diaphragm mounted on said member and connected to the latter and said support so that rotation of said member will adjust said diaphragm, and means on said support cooperating with and engaging complementary means on said spring to indicate adjustments of said diaphragm.

6. A diaphragm assembly comprising, in combination, a tubular support, a tubular diaphragm-operating member rotatably mounted on said support, means to position said member axially on and in coaxial relation with said support, means including an annular axially flexible and bowed spring attached to and rotatable with said member and concentric with said support to connect the latter resiliently to and in axial relation with said member, a diaphragm carried by said member and connected to the latter and support so that rotation of said member on said support will adjust said diaphragm, means on said support cooperating with said connecting means to indicate points of adjustment of said diaphragm, and means on said support cooperating with and engaging complementary means on said bowed spring to indicate additional points of adjustment of said diaphragm.

7. A diaphragm assembly comprising, in combination, a tubular support, a tubular diaphragm-operating member rotatably mounted on said support, means to position said member axially on and in coaxial relation with said support, means including an annular bowed spring carried by and movable as a unit with said member and concentric with and engaging said support to connect the latter yieldably to and in axial relation with said member, a diaphragm carried by said member and connected to the latter and support so that rotation of said member on said support will adjust said diaphragm, means on said support cooperating with said connecting means to provide limiting points of adjustments of said diaphragm, said spring being formed with annularly spaced recesses, and a fixed ball carried by said support and adapted to engage selectively said recesses to provide intermediate points of adjustment of said diaphragm.

8. A diaphragm assembly comprising, in combination, a tubular support, a tubular diaphragm-operating member rotatably mounted on said support, means to position said member axially on and in coaxial relation with said support, said support being formed with concentrically arranged arcuate slots, axially extending lugs formed on said member and extending through said slots, means carried by said lugs and engaging said support yieldably to connect said member to and retain it in axial relation with said support, a diaphragm carried by said member and connected to the latter and said support so that rotation of said member will adjust said diaphragm, and means on said support cooperating with said lugs to provide points of adjustment for said diaphragm.

9. A diaphragm assembly comprising, in combination, a tubular support, a tubular diaphragm-operating member rotatably mounted on said support, means to position said member axially on and in coaxial relation with said support, said support being formed with concentrically arranged arcuate slots, axially extending lugs formed on said member and extending through said slots, an annular bowed spring carried by said lugs and arranged concentrically with and engaging said support to connect the latter yieldably to and in axial relation with said member, an annular shoulder formed on said member and concentric therewith, a diaphragm positioned on said shoulder and connected to said support and member so that the rotation of the latter will adjust said diaphragm, the engagement of the lugs with the ends of the slots affording limiting adjustments for said diaphragm, said spring being formed with a group of annularly spaced recesses, and a ball carried by said support and adapted to engage selectively with said recesses to afford intermediate points of adjustment for said diaphragm.

CHARLES M. LEE.

REFERENCES CITED

The following references are of record in the file of this patent:

UNITED STATES PATENTS

| Number | Name | Date |
|---|---|---|
| 2,000,811 | Wollensak | May 7, 1935 |
| 2,322,034 | Lee | June 15, 1943 |
| 2,411,777 | Czarnikow | Nov. 26, 1946 |

FOREIGN PATENTS

| Number | Country | Date |
|---|---|---|
| 3,879 | Great Britain | of 1886 |